United States Patent
Toyama et al.

(10) Patent No.: US 9,546,306 B2
(45) Date of Patent: Jan. 17, 2017

(54) CATIONICALLY CURABLE RESIN COMPOSITION FOR ASSEMBLING HARD DISK DEVICES

(71) Applicant: KYORITSU CHEMICAL & CO., LTD., Tokyo (JP)

(72) Inventors: Shigeki Toyama, Chiba (JP); Yoshitomo Denpou, Chiba (JP)

(73) Assignee: KYORITSU CHEMICAL & CO., LTD., Tokyo (JP)

( * ) Notice: Subject to any disclaimer, the term of this patent is extended or adjusted under 35 U.S.C. 154(b) by 0 days.

(21) Appl. No.: 14/358,106

(22) PCT Filed: Nov. 20, 2012

(86) PCT No.: PCT/JP2012/080004
§ 371 (c)(1),
(2) Date: May 14, 2014

(87) PCT Pub. No.: WO2013/084708
PCT Pub. Date: Jun. 13, 2013

(65) Prior Publication Data
US 2014/0316081 A1 Oct. 23, 2014

(30) Foreign Application Priority Data
Dec. 5, 2011 (JP) .................. 2011-265917

(51) Int. Cl.
| | | |
|---|---|---|
| C09J 163/04 | (2006.01) | |
| C08F 4/20 | (2006.01) | |
| C09J 163/00 | (2006.01) | |
| C09J 5/00 | (2006.01) | |
| C08F 4/00 | (2006.01) | |
| G11B 5/48 | (2006.01) | |
| C08K 5/00 | (2006.01) | |
| C08F 216/12 | (2006.01) | |
| C08F 216/14 | (2006.01) | |
| C08F 216/16 | (2006.01) | |
| C08K 5/03 | (2006.01) | |
| C08K 5/375 | (2006.01) | |

(52) U.S. Cl.
CPC .............. C09J 163/04 (2013.01); C08F 4/00 (2013.01); C08F 4/20 (2013.01); C08K 5/0025 (2013.01); C09J 5/00 (2013.01); C09J 163/00 (2013.01); G11B 5/4826 (2013.01); C08F 216/125 (2013.01); C08F 216/1416 (2013.01); C08F 216/165 (2013.01); C08K 5/03 (2013.01); C08K 5/375 (2013.01)

(58) Field of Classification Search
CPC .................. C08L 63/00; C09J 163/04
USPC ............................................ 525/524
See application file for complete search history.

(56) References Cited

U.S. PATENT DOCUMENTS

| | | | |
|---|---|---|---|
| 6,777,460 B2 * | 8/2004 | Palazzotto | C08G 59/687 522/168 |
| 2004/0122122 A1 | 6/2004 | Palazzotto et al. | |
| 2005/0004246 A1 | 1/2005 | Palazzotto et al. | |
| 2007/0225458 A1 | 9/2007 | Kimura et al. | |
| 2009/0209677 A1 * | 8/2009 | Yokota | C08G 18/10 522/168 |
| 2010/0227941 A1 | 9/2010 | Ueda et al. | |
| 2012/0295199 A1 | 11/2012 | Takeyama et al. | |

FOREIGN PATENT DOCUMENTS

| | | |
|---|---|---|
| CN | 1989145 A | 6/2007 |
| JP | 2004-137321 A | 5/2004 |
| JP | 2006-511670 A | 4/2006 |
| JP | 2009-62510 A | 3/2009 |
| JP | 2010-13507 A | 1/2010 |
| WO | 2011/093236 A1 | 8/2011 |

OTHER PUBLICATIONS

International Search Report for corresponding International Application No. PCT/JP2012/080004, mailed Feb. 12, 2013 (2 pages).

* cited by examiner

*Primary Examiner* — Megan McCulley
(74) *Attorney, Agent, or Firm* — Osha • Liang LLP

(57) ABSTRACT

The present invention provides a cationically curable resin composition for assembling hard disk devices which comprises a resin having a cationically polymerizable functional group (a component A) and a cationic polymerization initiator (a component B), the component B being at least one selected from the group consisting of $X^+(SbF_6)^-$ (B1), $X^+(B(C_6F_5)_4)^-$ (B2) and $X^+((Rf)_n PF_{6-n})^-$ (B3) (in the formulae, $X^+$ is iodonium or sulfonium, Rf is a fluorinated alkyl having 1 to 6 carbon atoms, and n is an integer of 1 to 6). The invention also provides a hard disk device manufacturing method using the composition, and a hard disk device assembled with the composition.

10 Claims, No Drawings

CATIONICALLY CURABLE RESIN COMPOSITION FOR ASSEMBLING HARD DISK DEVICES

TECHNICAL FIELD

The present invention relates to a cationically curable resin composition for assembling hard disk devices, a hard disk device manufacturing method using the composition, and a hard disk device assembled with the composition.

BACKGROUND ART

Assembling of hard disks essentially involves steps for fixing a magnetic head periphery with an adhesive. For example, such steps include fixing of piezoelectric elements, fixing of magnetic heads, and fixing of a magnetic head with a suspension (a head gimbal assembly (HGA)). The adhesives used in these steps require low-outgassing properties to prevent the occurrence of reading and writing errors ascribed to the outgas components being attached to the disk surface or the magnetic head. Such low-outgassing adhesives have been sought for. For example, Patent Literature 1 discloses an epoxy resin composition which contains an epoxy compound, a partially (meth)acrylated epoxy compound, a (meth)acrylic compound, an amine curing agent and a photoinitiator.

PRIOR ART LITERATURE

Patent Literature

Patent Literature 1: Japanese Patent Application Kokai Publication No. 2010-013507

DISCLOSURE OF THE INVENTION

Technical Problem

The epoxy resin composition disclosed in Patent Literature 1 involves combined use of components having epoxy groups which can undergo anionic polymerization and components having (meth)acrylic groups which are radically polymerizable, and thereby achieves a reduction in outgassing ascribed to the photoinitiator. From the viewpoint of productivity, the literature adopts a bonding approach in which the composition is irradiated with energy rays to effect temporary fixing of parts and is thereafter full-cured by thermal curing. However, radical polymerization of acrylate compounds by energy ray irradiation results in the generation of large amounts of outgas derived from unreacted monomers and radical initiators. Thus, such an approach is not suited to be used in the periphery of a magnetic head of a hard disk whose miniaturization and refinement have currently been in rapid progress.

It is an object of the present invention to provide a cationically curable resin composition for assembling hard disk devices which exhibits good adhesion upon energy irradiation and heating and which releases a reduced amount of outgas when irradiated with energy rays, as well as to provide a hard disk device manufacturing method using the composition, and a hard disk device assembled with the composition.

Solution to Problem

The present invention resides in:
(1) A cationically curable resin composition for assembling hard disk devices, comprising a resin having a cationically polymerizable functional group (a component A) and a cationic polymerization initiator (a component B),
the component B being at least one selected from the group consisting of the following formulae:

$$X^+(SbF_6)^-  \quad (B1),$$

$$X^+(B(C_6F_5)_4)^-  \quad (B2), \text{ and}$$

$$X^+((Rf)_n PF_{6-n})^-  \quad (B3)$$

(in the formulae, $X^+$ is iodonium or sulfonium, Rf is a fluorinated alkyl having 1 to 6 carbon atoms, and n is an integer of 1 to 6).

(2) A hard disk device manufacturing method comprising a step of bonding a magnetic head periphery in a hard disk device using the cationically curable resin composition for assembling hard disk devices described in (1).

(3) A hard disk device assembled with the cationically curable resin composition for assembling hard disk devices described in (1).

Advantageous Effects of the Invention

The present invention provides the cationically curable resin composition for assembling hard disk devices which exhibits good adhesion upon energy irradiation and heating and releases a reduced amount of outgas when irradiated with energy rays. The present invention also provides the hard disk device manufacturing method using the composition, and the hard disk device assembled with the composition.

BEST MODE FOR CARRYING OUT THE INVENTION

A cationically curable resin composition for assembling hard disk devices of the present invention comprises a resin having a cationically polymerizable functional group (a component A) and a cationic polymerization initiator (a component B).

[Resin Having Cationically Polymerizable Functional Group: Component A]

In order to reduce the amount of unreacted components by achieving higher reactivity as well as by eliminating oxygen inhibition and thereby in order to reduce outgassing, the resin having a cationically polymerizable functional group is preferably at least one selected from the group consisting of epoxy group-containing resins, oxetanyl group-containing resins and vinyl ether group-containing resins. More preferably, the resin is an epoxy group-containing resin and/or an oxetanyl group-containing resin, and is still more preferably an epoxy group-containing resin. A particularly preferred resin is a mixture of an epoxy group-containing resin having an epoxy equivalent of not less than 150 and an oxetanyl group-containing resin or an epoxy-group containing resin having an epoxy equivalent of less than 150.

The epoxy group-containing resins are required to be able to maintain the accuracy in the fixing of hard disk assembly parts and to have high glass transition temperature due to necessity of heat resistance. The resins also need to have adhesion to assembly parts. From these viewpoints, the epoxy group-containing resin is preferably at least one resin selected from the group consisting of bisphenol A type epoxy resin, hydrogenated bisphenol A type epoxy resin, bisphenol F type epoxy resin, bisphenol AD type epoxy resin, naphthalene type epoxy resin, phenol novolak type epoxy resin, cresol novolak type epoxy resin, alicyclic epoxy resin and polybutadiene epoxy resin. More preferably, the epoxy group-containing resin is at least one resin selected from the group consisting of bisphenol A type epoxy resin, hydrogenated bisphenol A type epoxy resin, bisphenol F type epoxy resin, cresol novolak type epoxy resin and alicyclic epoxy resin, and is still more preferably bisphenol A type epoxy resin, bisphenol F type epoxy resin, cresol novolak type epoxy resin and/or alicyclic epoxy resin. Particularly preferably, the resin is at least one resin having an epoxy equivalent of not less than 150 that is selected from the group consisting of bisphenol A type epoxy resin, hydrogenated bisphenol A type epoxy resin, bisphenol F type epoxy resin, cresol novolak type epoxy resin and alicyclic epoxy resin. Further preferably, the resin is a mixture of at least one resin having an epoxy equivalent of not less than 150 that is selected from the group consisting of bisphenol A type epoxy resin, hydrogenated bisphenol A type epoxy resin, bisphenol F type epoxy resin, cresol novolak type epoxy resin and alicyclic epoxy resin, and an alicyclic epoxy resin having an epoxy equivalent of less than 150.

Specific examples of the bisphenol A type epoxy resins include EPICLON 850, 850-S, 860 and 1055 manufactured by DIC.

Specific examples of the hydrogenated bisphenol A type epoxy resins include KRM-2408 manufactured by ADEKA and YX-8034 manufactured by JER.

Specific examples of the bisphenol F type epoxy resins include EPICLON 830-S and EXA-830LVP manufactured by DIC.

Specific examples of the naphthalene type epoxy resins include EPICLON HP-4032D and HP-7200H manufactured by DIC.

Specific examples of the phenol novolak type epoxy resins include EPICLON N-740 and N-770 manufactured by DIC.

Specific examples of the cresol novolak type epoxy resins include EPICLON N-660, N-670 and N-655-EXP-S manufactured by DIC.

Specific examples of the alicyclic epoxy resins, in particular, the alicyclic epoxy resins having an epoxy equivalent of less than 150 include 3',4'-epoxycyclohexylmethyl 3,4-epoxycyclohexane carboxylate (CELLOXIDE 2021P manufactured by DAICEL CORPORATION), 1,2:8,9-diepoxylimonene (CELLOXIDE 3000 manufactured by DAICEL CORPORATION) and 1,2-epoxy-4-vinylcyclohexane (CELLOXIDE 2000 manufactured by DAICEL CORPORATION). Specific examples of the alicyclic epoxy resins having an epoxy equivalent of not less than 150 include adduct of 2,2-bis(hydroxymethyl)-1-butanol with 1,2-epoxy-4-(2-oxiranyl)cyclohexane (EHPE3150 manufactured by DAICEL CORPORATION).

The oxetanyl group-containing resin is preferably at least one compound selected from the group consisting of 3-ethyl-3-hydroxymethyloxetane (oxetane alcohol) (for example, OXT-101 manufactured by TOAGOSEI CO., LTD.), 2-ethylhexyloxetane (for example, OXT-212 manufactured by TOAGOSEI CO., LTD.), xylylenebisoxetane (XDO: for example, OXT-121 manufactured by TOAGOSEI CO., LTD.), 3-ethyl-3{[(3-ethyloxetan-3-yl)methoxy]methyl}oxetane (for example, OXT-221 manufactured by TOAGOSEI CO., LTD.), oxetanylsilsesquioxetane (for example, OXT-191 manufactured by TOAGOSEI CO., LTD.), phenol novolak oxetane (for example, PHOX manufactured by TOAGOSEI CO., LTD.) and 3-ethyl-3-phenoxymethyloxetane (PDX: for example, OXT-211 manufactured by TOAGOSEI CO., LTD.). The oxetanyl group-containing resin is more preferably at least one compound selected from the group consisting of 3-ethyl-3 {[(3-ethyl-oxetan-3-yl)methoxy]methyl}oxetane, xylylenebisoxetane, oxetanylsilsesquioxetane and 3-ethyl-3-phenoxymethyloxetane, and is still more preferably xylylenebisoxetane or 3-ethyl-3-phenoxymethyloxetane.

The vinyl ether group-containing resin is preferably at least one compound selected from the group consisting of hydroxybutyl vinyl ether (for example, HBVE manufactured by ISP), 1,4-cyclohexanedimethanol vinyl ether (for example, CHVE manufactured by ISP), triethylene glycol divinyl ether (for example, DVE-3 manufactured by ISP), dodecyl vinyl ether (for example, DDVE manufactured by ISP) and cyclohexyl vinyl ether (for example, CVE manufactured by ISP). The vinyl ether group-containing resin is more preferably at least one compound selected from the group consisting of 1,4-cyclohexanedimethanol vinyl ether, triethylene glycol divinyl ether and dodecyl vinyl ether, and is still more preferably a resin including 1,4-cyclohexanedimethanol vinyl ether.

[Cationic Polymerization Initiator: Component B]

The component B is at least one compound selected from the group consisting of the following formulae:

$$X^+(SbF_6)^- \quad (B1),$$

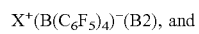

$$X^+(B(C_6F_5)_4)^- (B2), \text{ and}$$

$$X^+((Rf)_nPF_{6-n})^- \quad (B3)$$

(in the formulae, $X^+$ is iodonium or sulfonium, Rf is a fluorinated alkyl having 1 to 6 carbon atoms, and n is an integer of 1 to 6).

Examples of the compounds B1 include diphenyl 4-thiophenoxyphenylsulfonium hexafluoroantimonate (for example, CPI-101A manufactured by San-Apro Ltd., SP-170 and SP-172 manufactured by ADEKA, WPI-016 manufactured by Wako Pure Chemical Industries, Ltd., and SI series manufactured by SANSHIN CHEMICAL INDUSTRY CO., LTD.), represented by Formula (1) below:

[Chem. 1]

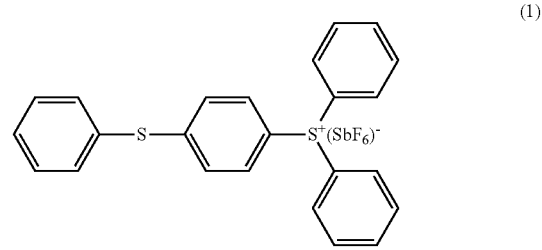

(1)

Examples of the compounds B2 include 4-methylphenyl-4-(1-methylethyl)phenyliodonium tetrakis(pentafluorophenyl)borate (for example, PI-2074 manufactured by Rhodia), represented by Formula (2) below:

[Chem. 2]

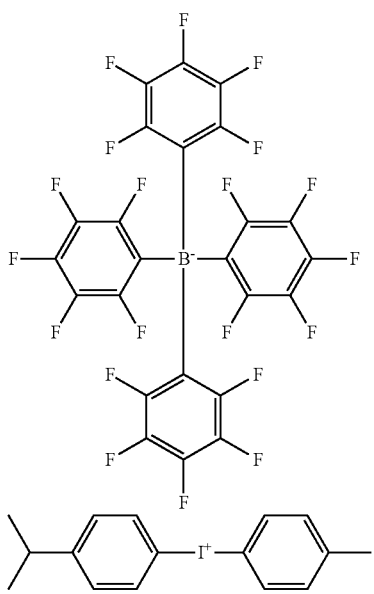

(2)

Examples of the compounds B3 include diphenyl 4-thio-phenoxyphenylsulfonium tris(pentafluoroethyl)trifluoro-phosphate (for example, CPI-210S and CPI-200K manufactured by San-Apro Ltd.), represented by Formula (3) below:

[Chem. 3]

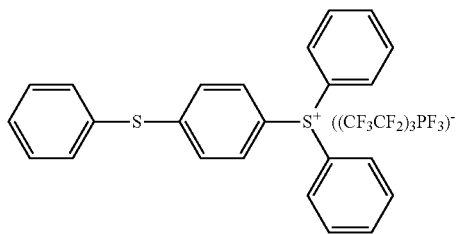

(3)

[Component C]

To reduce the curing stress due to curing shrinkage, it is preferable to add a filler (a component C) to the cationically curable resin composition for assembling hard disk devices of the present invention. Inorganic fillers and organic fillers may be used as the components C. Organic fillers are more preferable from the viewpoint of reducing the influence on the disks and the magnetic heads due to detachment from the resins. Examples of the inorganic fillers include talc, silica and mica. Examples of the organic fillers include polyacrylate particles, core-shell type polyacrylate particles, polystyrene particles, acrylic-styrene copolymer particles, polypropylene particles and polyethylene particles.

In order to obtain insulating properties required in the bonding of hard disk device assembly parts and in order to further reduce outgassing by the addition of the non-reactive component, the average particle diameter of the filler constituting particles is 0.5 to 150 µm, more preferably 1 to 100 µm, and still more preferably 5 to 50 µm. The average particle diameter of the component C may be measured with a laser diffraction/scattering particle size distribution analyzer (for example, Partica LA-950V2 manufactured by HORIBA).

[Other Components]

The cationically curable resin composition for assembling hard disk devices of the present invention may contain additives such as silane coupling agents and photosensitizers while still achieving the advantageous effects of the present invention.

From the viewpoint of the stability of cured strength of the cationically curable resin composition of the present invention, the silane coupling agent is preferably at least one selected from the group consisting of tetraalkoxysilanes such as tetramethoxysilane, tetraethoxysilane, tetrapropoxysilane, tetraisopropoxysilane, tetrabutoxysilane, dimethoxydiethoxysilane, dimethoxydiisopropoxysilane, diethoxydiisopropoxysilane and diethoxydibutoxysilane; trialkoxysilanes such as methyltrimethoxysilane, methyltriethoxysilane, methyltriisopropoxysilane, ethyltriethoxysilane, ethyltributoxysilane, cyclohexyltriethoxysilane, phenyltriisopropoxysilane, vinyltrimethoxysilane, 3-glycidoxypropyltrimethoxysilane and 3-methacryloxypropyltrimethoxysilane; and dialkoxysilanes such as dimethyldimethoxysilane, dimethyldiethoxysilane, diethyldiethoxysilane, diethyldibutoxysilane and phenylethyldiethoxysilane. The silane coupling agent is more preferably at least one trialkoxysilane selected from the group consisting of methyltrimethoxysilane, methyltriethoxysilane, methyltriisopropoxysilane, ethyltriethoxysilane, ethyltributoxysilane, cyclohexyltriethoxysilane, phenyltriisopropoxysilane, vinyltrimethoxysilane, 3-glycidoxypropyltrimethoxysilane and 3-methacryloxypropyltrimethoxysilane, and is still more preferably 3-glycidoxypropyltrimethoxysilane.

From the viewpoint of curability, examples of the photosensitizers include carbonyl compounds, organic sulfur compounds, persulfides, redox compounds, azo and diazo compounds, halogen compounds and photoreducible dyes. Specific examples of the photosensitizers include benzoin derivatives such as benzoin methyl ether, benzoin isopropyl ether and α,α-dimethoxy-α-phenylacetophenone; benzophenone derivatives such as benzophenone, 2,4-dichlorobenzophenone, methyl o-benzoylbenzoate and 4,4'-bis(diethylamino)benzophenone; thioxanthone derivatives such as 2,4-diethylthioxanthone, 2-chlorothioxanthone and 2-isopropylthioxanthone; anthraquinone derivatives such as 2-chloroanthraquinone and 2-methylanthraquinone; acridone derivatives such as N-methylacridone and N-butylacridone; and other compounds such as α,α-diethoxyacetophenone, benzyl, fluorenone, xanthone and uranyl compounds. These photosensitizers may be used singly, or two or more may be used in combination. A preferred photosensitizer is 2,4-diethylthioxanthone (for example, DETX-S manufactured by NIPPON KAYAKU CO., LTD.).

[Cationically Curable Resin Composition]

In order for the cationically curable resin composition for assembling hard disk devices of the present invention to ensure cured strength stably and to achieve reduced outgassing, the total content of the components A and B is preferably 30.0 to 100 wt %, more preferably 40.0 to 90.0 wt %, and still more preferably 50.0 to 80.0 wt % of the cationically curable resin composition of the present invention. The weight ratio A/B of the component A to the component B is preferably 99.9/0.1 to 90.0/10.0, more preferably 99.5/0.5 to 93.0/7.0, and still more preferably 99.0/1.0 to 97.0/3.0. When the cationically curable resin composition of the present invention contains the component C, the content of the component C is preferably 5.0 to 90.0 parts by weight, more preferably 10.0 to 85.0 parts by weight, and still more preferably 20.0 to 80.0 parts by weight with respect to 100 parts by weight of the component A. This content ensures that the component C is mixed stably with the resin and the curing shrinkage is restrained.

To improve curability, the amount of the photosensitizer, if any added, is preferably 0.3 to 30.0 parts by weight, more preferably 1.0 to 25.0 parts by weight, still more preferably 5.0 to 25.0 parts by weight, and further preferably 10.0 to 20.0 parts by weight with respect to 100 parts by weight of the component B.

[Hard Disk Device Manufacturing Method]

In a hard disk device manufacturing method including a step in which a magnetic head periphery in a hard disk device is bonded, the cationically curable resin composition of the present invention may be used to effect bonding of the periphery of the magnetic head, for example, fixing of a piezoelectric element, fixing of the magnetic head, and fixing of the magnetic head with a suspension (a head gimbal assembly (HGA)). With use of the composition of the present invention, it becomes possible to prevent the occurrence of reading and writing errors ascribed to outgas components attached to the disk surface or the magnetic head, and thus high-quality hard disk devices may be manufactured.

EXAMPLES

In Examples 1 to 8 and Comparative Examples 1 and 2, compositions were produced from the following raw materials.

(1) Polymerizable Resins

[Resins having Cationically Polymerizable Functional Group (Components A)]

Bisphenol A type epoxy resin (EPICLON 850 manufactured by DIC);

Bisphenol F type epoxy resin (EPICLON EXA-830LVP manufactured by DIC);

Cresol novolak type epoxy resin (EPICLON N-655-EXP-S manufactured by DIC);

Polyfunctional epoxy (3',4'-epoxycyclohexylmethyl 3,4-epoxycyclohexane carboxylate) (CELLOXIDE 2021P manufactured by DAICEL CORPORATION);

Monofunctional oxetane (3-ethyl-3-phenoxymethyloxetane) (PDX: OXT-211 manufactured by TOAGOSEI CO., LTD.);

Xylylene bisoxetane (1,4-bis[(3-ethyl-3-oxetanyl-methoxy)methyl]benzene (main component)) (XDO: OXT-121 manufactured by TOAGOSEI CO., LTD.).

[Resin having Radically Polymerizable Functional Group]

Bisphenol A type acrylic resin (KAYAHARD R-280 manufactured by NIPPON KAYAKU CO., LTD.) (diluted with 2-hydroxypropyl methacrylate to 20%).

(2) Polymerization Initiators

[Cationic Polymerization Initiators (Components B)]

Diphenyl 4-thiophenoxyphenylsulfonium hexafluoroantimonate (CPI-101A manufactured by San-Apro Ltd. (Example 1) or SP-172 manufactured by ADEKA (Example 6)) (compound B1: Formula (1) above);

4-Methylphenyl-4-(1-methylethyl)phenyliodonium tetrakis(pentafluorophenyl)borate (PI-2074 manufactured by Rhodia) (compound B2: Formula (2) above);

Diphenyl 4-thiophenoxyphenylsulfonium tris(pentafluoroethyl)trifluorophosphate (CPI-210S manufactured by San-Apro Ltd.) (compound B3: Formula (3) above).

[Cationic Polymerization Initiator (other than Components B)]

Diphenyl 4-thiophenoxyphenylsulfonium hexafluorophosphate (CPI-100P manufactured by San-Apro Ltd.) (Formula (4) below):

[Chem. 4]

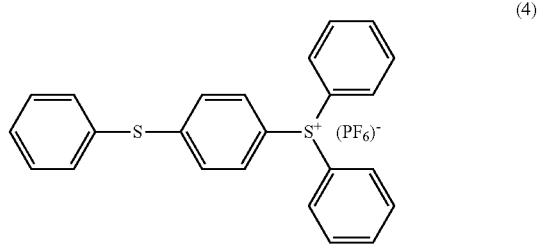

(4)

[Radical Polymerization Initiator]

(1-Hydroxycyclohexyl)phenyl ketone (IRGACURE 184 manufactured by BASF).

According to the formulations described in Table 1, the polymerizable resins and the polymerization initiators (the total weight was 154 g except in Comparative Example 2 in which the total weight was 104 g) were added to a mixing tank (No. 300 (manufactured by KINKI YOKI CO., LTD.), 300 ml volume, polyethylene) and were stirred with a stirrer (RW28 (manufactured by IKA), 600 rpm) at room temperature until the blends became transparent, thereby producing cationically curable resin compositions of Examples 1 to 8 of the present invention as well as compositions of Comparative Examples 1 and 2. The room temperature in Examples was 23° C.

[Evaluation Conditions]

The occurrence of outgassing during the curing of the compositions of Examples 1 to 8 and Comparative Examples 1 and 2 was evaluated in the following manner.

Molds 1 mm in thickness and 4.5 mm in diameter were formed in silicon. The resin compositions of Examples 1 to 8 and Comparative Examples 1 and 2 were each poured into the mold and sandwiched between PET films. With a metal halide lamp manufactured by EYE GRAPHICS CO., LTD., the resin compositions were irradiated at 6000 mJ/cm² (365 nm) to give test pieces. With respect to the test pieces thus fabricated, the rate of weight reduction by heating was determined with TGA/DSC1 manufactured by METTLER TOLEDO. The temperature program was such that the temperature was raised from 25° C. to 120° C. at 10° C./min and was held at 120° C. for 5 hours. The rate of weight reduction (outgassing) was calculated from the mass (W0) of the test piece immediately after fabrication and the mass (W1) after 5 hours at 120° C.

Rate of weight reduction=$((W1-W0)/W0)\times 100$

The results are described in Tables 1 and 2.

TABLE 1

|  |  |  | Example 1 | Example 2 | Example 3 | Example 4 | Example 5 |
|---|---|---|---|---|---|---|---|
| Polymerizable resins | Cationically polymerizable | Bisphenol A type epoxy resin | 100 g |  |  | 100 g | 100 g |

TABLE 1-continued

|  |  |  | Example 1 | Example 2 | Example 3 | Example 4 | Example 5 |
|---|---|---|---|---|---|---|---|
|  | (Epoxy equivalent 150 or more) | EPICLON 850 Bisphenol F type epoxy resin EPICLON EXA-830LVP |  | 100 g |  |  |  |
|  |  | Cresol novolak type epoxy resin EPICLON N-655-EXP-S |  |  | 100 g |  |  |
|  | Cationically polymerizable | Polyfunctional epoxy CEL 2021P | 50 g | 50 g | 50 g |  |  |
|  |  | Monofunctional oxetane (POX) OXT-211 |  |  |  | 50 g |  |
|  |  | Xylylene bisoxetane (XDO) OXT-121 |  |  |  |  | 50 g |
|  | Radically polymerizable | Bisphenol A type acrylic resin KAYAHARD R-280 |  |  |  |  |  |
| Polymerization initiators | Cation | Compound B1: Formula (1) | 4 g | 4 g | 4 g | 4 g | 4 g |
|  |  | Compound B2: Formula (2) |  |  |  |  |  |
|  |  | Compound B3: Formula (3) |  |  |  |  |  |
|  |  | Sulfonium hexafluorophosphate salt: Formula (4) |  |  |  |  |  |
|  | Radical | IRGACURE 184 |  |  |  |  |  |
|  | Outgass (%) |  | 0.16 | 0.46 | 0.45 | 0.39 | 0.52 |

TABLE 2

|  |  |  | Ex. 1 | Ex. 6 | Ex. 7 | Ex. 8 | Comp. Ex. 1 | Comp. Ex. 2 |
|---|---|---|---|---|---|---|---|---|
| Polymerizable resins | Cationically polymerizable (Epoxy equivalent 150 or more) | Bisphenol A type epoxy resin EPICLON 850 | 100 g | 100 g | 100 g | 100 g | 100 g |  |
|  |  | Bisphenol F type epoxy resin EPICLON EXA-830LVP |  |  |  |  |  |  |
|  |  | Cresol novolak type epoxy resin EPICLON N-655-EXP-S |  |  |  |  |  |  |
|  | Cationically polymerizable | Polyfunctional epoxy CEL 2021P | 50 g | 50 g | 50 g | 50 g | 50 g |  |
|  |  | Monofunctional oxetane (POX) OXT-211 |  |  |  |  |  |  |
|  |  | Xylylene bisoxetane (XDO) OXT-121 |  |  |  |  |  |  |
|  | Radically polymerizable | Bisphenol A type acrylic resin KAYAHARD R-280 |  |  |  |  |  | 100 g |
| Polymerization initiators | Cation | Compound B1: Formula (1) | 4 g | 4 g |  |  |  |  |
|  |  | Compound B2: Formula (2) |  |  | 4 g |  |  |  |
|  |  | Compound B3: Formula (3) |  |  |  | 4 g |  |  |
|  |  | Sulfonium hexafluorophosphate salt: Formula (4) |  |  |  |  | 4 g |  |
|  | Radical | IRGACURE 184 |  |  |  |  |  | 4 g |
|  | Outgass (%) |  | 0.16 | 0.56 | 0.58 | 0.58 | 1.00 | 1.63 |

It was demonstrated that the cationically curable resin compositions of Examples 1 to 8 achieved lower levels of outgassing compared to the compositions of Comparative Examples 1 and 2, and had a weight reduction rate of less than 1 mass %.

The invention claimed is:

1. A cationically curable resin composition for assembling hard disk devices, consisting of:
a resin having a cationically polymerizable functional group (a component A) and a cationic polymerization initiator (a component B),
the component B being at least one selected from the group consisting of the following formulae:

$$X^+(SbF_6)^- \qquad (B1),$$

$$X^+(B(C_6F_5)_4)^- \qquad (B2), \text{ and}$$

$$X^+((Rf)_nPF_{6-n})^- \qquad (B3)$$

wherein in the formulae, $X^+$ is iodonium or sulfonium, Rf is a fluorinated alkyl having 1 to 6 carbon atoms, and n is an integer of 1 to 6;
the component A is a mixture of an epoxy group-containing resin having an epoxy equivalent of not less than 150 and an oxetanyl group-containing resin,
the epoxy group-containing resin having an epoxy equivalent of not less than 150 is at least one resin selected from the group consisting of a bisphenol A type epoxy resin, a hydrogenated bisphenol A epoxy resin, a bisphenol F epoxy resin, a cresol novolak epoxy resin and an adduct of 2,2-bis(hydroxymethyl)-1-butanol with 1,2-epoxy-4-(2-oxiranyl)cyclohexane,
the oxetanyl group-containing resin is at least one resin selected from the group consisting of 3-ethyl-3-hydroxymethyloxetane, 2-ethylhexyloxelane, xylylenebisoxetane, 3-ethyl-3{[(3-ethyloxetan-3-yl)methoxy]methyl}oxetane, oxetanylsilsesquioxetane, phenol novolak oxetane and 3-ethyl-3-phenoxymethyloxetane.

2. The cationically curable resin composition for assembling hard disk devices according to claim 1, wherein the rate of weight reduction by heating of the cured product is less than 1 mass %.

3. A hard disk device manufacturing method comprising a step of bonding a magnetic head periphery in a hard disk device using the cationically curable resin composition for assembling hard disk devices described in claim 1.

4. A hard disk device assembled with the cationically curable resin composition for assembling hard disk devices described in claim 1.

5. The cationically curable resin composition for assembling hard disk devices according to claim 1, wherein the oxetanyl group-containing resin is 3-ethyl-3-phenoxymethyloxetane.

6. A cationically curable resin composition for assembling hard disk devices, consisting of:
a resin having a cationically polymerizable functional group (a component A), a cationic polymerization initiator (a component B), and at least one component selected from the group consisting of a filler, a silane coupling agent and a photosensitizer,
the component B being at least one selected from the group consisting of the following formulae:

$$X^+(SbF_6)^- \qquad (B1),$$

$$X^+(B(C_6F_5)_4)^- \qquad (B2), \text{ and}$$

$$X^+((Rf)_nPF_{6-n})^- \qquad (B3)$$

wherein in the formulae, $X^+$ is iodonium or sulfonium, Rf is a fluorinated alkyl having 1 to 6 carbon atoms, and n is an integer of 1 to 6;
the component A is a mixture of an epoxy group-containing resin having an epoxy equivalent of not less than 150 and an oxetanyl group-containing resin,
the epoxy group-containing resin having an epoxy equivalent of not less than 150 is at least one resin selected from the group consisting of a bisphenol A epoxy resin, a hydrogenated bisphenol A epoxy resin, a bisphenol F epoxy resin, a cresol novolak epoxy resin and an adduct of 2,2-bis(hydroxymethyl)-1-butanol with 1,2-epoxy-4-(2-oxiranyl)cyclohexane,
the oxetanyl group-containing resin is at least one resin selected from the group consisting of 3-ethyl-3-hydroxymethyloxetane, 2-ethylhexyloxelane, xylylenebisoxetane, 3-ethyl-3{[(3-ethyloxetan-3-yl)methoxy]methyl}oxetane, oxetanylsilsesquioxetane, phenol novolak oxetane and 3-ethyl-3-phenoxymethyloxetane.

7. The cationically curable resin composition for assembling hard disk devices according to claim 6, wherein the rate of weight reduction by heating of the cured product is less than 1 mass %.

8. A hard disk device manufacturing method comprising a step of bonding a magnetic head periphery in a hard disk device using the cationically curable resin composition for assembling hard disk devices described in claim 6.

9. A hard disk device assembled with the cationically curable resin composition for assembling hard disk devices described in claim 6.

10. The cationically curable resin composition for assembling hard disk devices according to claim 6, wherein the oxetanyl group-containing resin is 3-ethyl-3-phenoxymethyloxetane.

* * * * *

UNITED STATES PATENT AND TRADEMARK OFFICE
CERTIFICATE OF CORRECTION

PATENT NO. : 9,546,306 B2
APPLICATION NO. : 14/358106
DATED : January 17, 2017
INVENTOR(S) : Shigeki Toyama et al.

Page 1 of 1

It is certified that error appears in the above-identified patent and that said Letters Patent is hereby corrected as shown below:

In the Claims

Claim 1, Column 11, Line 27, the word "type" should be deleted.

Claim 1, Column 11, Line 34, the word "2-ethylhexyloxelane" should read -- 2-ethylhexyloxetane --.

Claim 6, Column 12, Line 33, the word "2-ethylhexyloxelane" should read -- 2-ethylhexyloxetane --.

Signed and Sealed this
Eighteenth Day of April, 2017

Michelle K. Lee
*Director of the United States Patent and Trademark Office*